United States Patent
Fujioka

(10) Patent No.: US 7,013,247 B2
(45) Date of Patent: Mar. 14, 2006

(54) METHOD OF DESIGNING FORMS OF CABLE CLAMP AND CABLES USING THREE-DIMENSIONAL CAD SYSTEM, AND COMPUTER READABLE STORAGE MEDIUM STORING RELEVANT PROCESSES

(75) Inventor: Koichi Fujioka, Tokyo (JP)

(73) Assignee: NEC Corporation, Tokyo (JP)

( * ) Notice: Subject to any disclaimer, the term of this patent is extended or adjusted under 35 U.S.C. 154(b) by 879 days.

(21) Appl. No.: 09/924,720

(22) Filed: Aug. 9, 2001

(65) Prior Publication Data

US 2002/0040256 A1    Apr. 4, 2002

(30) Foreign Application Priority Data

Aug. 14, 2000   (JP)   .............................. 2000-245945

(51) Int. Cl.
*G06F 17/50* (2006.01)
(52) U.S. Cl. ........................... 703/1; 706/919; 715/964
(58) Field of Classification Search .................... 703/1; 706/919; 715/964
See application file for complete search history.

(56) References Cited

U.S. PATENT DOCUMENTS 5,021,968 A * 6/1991 Ferketic .......................... 703/1
6,452,095 B1 * 9/2002 Perrault ..................... 174/40 R

FOREIGN PATENT DOCUMENTS

| JP | 5-114012 A | 5/1993 |
| JP | 09-167173 | 6/1997 |
| JP | 10-21269 | 1/1998 |
| JP | 2000-163452 | 6/2000 |
| JP | 2000-163452 A | 6/2000 |
| JP | 2000-192528 A | 7/2000 |

OTHER PUBLICATIONS

Newton, Randall s.; "Intelligent isometrics for 3D piping models in support of the engineering life cycle", Jan. 2000, Microstation Manager.*

* cited by examiner

*Primary Examiner*—Paul L. Rodriguez
*Assistant Examiner*—Russ Guill
(74) *Attorney, Agent, or Firm*—Sughrue Mion, PLLC

(57) ABSTRACT

A method of designing the form of a cable clamp and cables using a three-dimensional CAD system for easily designing the form of the cables passing through the cable clamp is disclosed. According to the method, the cable clamp is checked by comparing the area necessary for clamping the cables with the inner-diameter area of the cable clamp; the control points related to the cable clamp are designated; and the data of the designated control points are added to the data of control points assigned to each cable in advance. Therefore, the form of the clamped portion of each cable can be simultaneously determined together with the forms of the other portions of the cable, so that the designer can execute the verification of the cable clamp and the design of the cable forms in a short time.

12 Claims, 5 Drawing Sheets

FIG. 2
| CABLE NAME | DIAMETER | BEND RADIUS | POSITION OF CONTROL POINTS IN CABLE ROUTING |
|---|---|---|---|
| CABLE 1 | 5 | 15 | (100, 200) (200, 400) (1000, 300) |
| CABLE 2 | 3 | 10 | (50, 100) (140, 140) (1000, 120) |
| CABLE 3 | 7 | 30 | (0, 120) (1000, 300) |
FIG. 3
| CABLE NAME | DIAMETER | AREA |
|---|---|---|
| CABLE 1 | 5 | 5 × 5 = 25 |
| CABLE 2 | 3 | 3 × 3 = 9 |
| CABLE 3 | 7 | 7 × 7 = 49 |
FIG. 4
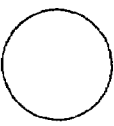
| CABLE CLAMP | INNER DIAMETER | INNER-DIAMETER FORM | INNER-DIAMETER AREA | CLAMPING WIDTH |
|---|---|---|---|---|
| CABLE CLAMP A | 16 | ○ | 201 | 5 |
FIG. 5
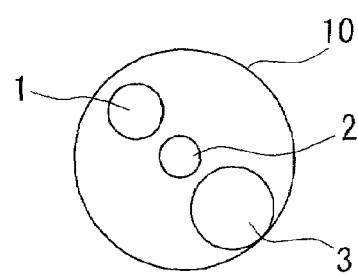

| CABLE NAME | DIAMETER | BEND RADIUS | POSITION OF CONTROL POINTS IN CABLE ROUTING |
|---|---|---|---|
| CABLE 1 | 5 | 15 | (100, 200) (200, 400) (300, 130) (315, 130) (320, 130) (335, 130) (1000, 300) |
| CABLE 2 | 3 | 10 | (50, 100) (140, 140) (305, 125) (315, 125) (320, 125) (330, 125) (1000, 120) |
| CABLE 3 | 7 | 30 | (0, 120) (285, 120) (315, 120) (320, 120) (350, 120) (1000, 300) |

METHOD OF DESIGNING FORMS OF CABLE CLAMP AND CABLES USING THREE-DIMENSIONAL CAD SYSTEM, AND COMPUTER READABLE STORAGE MEDIUM STORING RELEVANT PROCESSES

BACKGROUND OF THE INVENTION

1. Field of the Invention

The present invention relates to a method of designing the form (or routing) of cables using a three-dimensional CAD (computer-aided design) system, and in particular, to a method of designing a geometric model of a cable clamp and clamped cables and a storage medium for making a computer execute the method.

2. Description of the Related Art

Recent CAD systems have various functions, and three-dimensional CAD systems are sometimes used for determining the routing of cables (i.e., cable routing or laying).

In order to design cables, cable routing should be first determined. In addition, cable clamps are also necessary to safely and firmly fix the cables. That is, when cable clamps are used, those suitable for the surrounding environment must be chosen and simultaneously, the form of each cable which passes through the chosen cable clamp must be designed.

In order to design the form of the cable passing through the cable clamp, a cable clamp for clamping cables is chosen, and then the route of each cable passing through the cable clamp is determined, so that a design model of the cable is formed.

However, conventional CAD systems do not have sufficient computer-aided design functions for designing the form of the cable clamped by the cable clamp. Therefore, in conventional design of cables, interference between a cable clamp and a cable (in which their form models intersect each other) may occur, or cables may not be clamped in the chosen cable clamp (that is, the inner diameter of the cable clamp is too small to clamp the cables), so that a re-design or the like may be necessary which increases the design time.

In addition, after the design of the cable form is completed, the specifications of the cable, including attribute data such as the diameter and the minimum bend radius of the cable, may be modified, or components or positions of the cable clamp may be changed. In this case, the cable routing should also be modified, thereby placing a burden on the designer.

As explained above, conventional three-dimensional CAD systems do not have sufficient computer-aided design functions for designing the forms of the cable clamp and cables; thus, the designer needs a lot of time for designing the cable form or routing.

SUMMARY OF THE INVENTION

In consideration of the above circumstances, an object of the present invention is to provide a method of designing the form of a cable clamp and cables using a three-dimensional CAD system for easily designing the form of the cables passing through the cable clamp. In conventional methods, such form design imposes a considerable burden on the designer.

Therefore, the present invention provides a method of designing forms of a cable clamp and cables using a three-dimensional CAD system, comprising:

a cable designating step of designating one or more cables to be clamped;

a cable area calculating step of calculating a cross-sectional area of each designated cable based on attribute data of each cable, and calculating an area necessary for clamping the cables based on a result of the calculation;

a cable clamp designating step of designating a cable clamp to be used;

a cable clamp checking step of comparing an inner-diameter area corresponding to an inner diameter of the cable clamp with the area necessary for clamping the cables;

a cable routing position for clamping designating step of designating control points assigned to a portion of each cable, which is affected by the cable clamp, wherein each control point indicates a reference position in a cable routing;

a cable routing position data adding step of adding data of the designated control points of each cable to data of control points of each cable which are assigned to each cable in advance; and a cable form generating step of generating a complete cable form based on the data obtained in the cable routing position data adding step.

According to this method, (i) the cable clamp is checked by comparing the area necessary for clamping the cables with the inner-diameter area of the cable clamp; (ii) the control points related to the cable clamp are designated; and (iii) the data of the designated control points are added to the data of control points assigned to each cable in advance. Therefore, the form of the clamped portion of each cable can be simultaneously determined together with the forms of the other portions of the cable, so that the designer can execute the verification of the cable clamp and the design of the cable forms in a short time. Therefore, the man-hour necessary for the design can be reduced, and the selection of the cable clamp and testing of the cable routing can be easily performed, thereby improving the design quality.

The present invention also provides a method of designing forms of a cable clamp and cables using a three-dimensional CAD system, comprising:

a cable designating step of designating one or more cables to be clamped;

a cable area calculating step of calculating a cross-sectional area of each designated cable based on attribute data of each cable, and calculating an area necessary for clamping the cables based on a result of the calculation;

a cable clamp selecting step of selecting one or more cable clamps suitable for the area necessary for clamping the cables;

a cable clamp designating step of designating a cable clamp to be used from among the selected cable clamps;

a cable routing position for clamping designating step of designating control points assigned to a portion of each cable, which is affected by the cable clamp, where each control point indicates a reference position in a cable routing;

a cable routing position data adding step of adding data of the designated control points of each cable to data of control points of each cable which are assigned to each cable in advance; and a cable form generating step of generating a complete cable form based on the data obtained in the cable routing position data adding step.

According to this method, (i) the cable clamp is selected based on the area necessary for clamping the cables; (ii) the control points related to the cable clamp are designated; and (iii) the data of the designated control points are added to the data of control points assigned to each cable in advance. Therefore, the form of the clamped portion of each cable can be simultaneously determined together with the forms of the other portions of the cable, so that the designer can design the cable forms in a short time. Therefore, the man-hour necessary for the design can be reduced, and the selection of the cable clamp and testing of the cable routing can be easily performed, thereby improving the design quality.

The present invention also provides a method of designing forms of a cable clamp and cables using a three-dimensional CAD system, comprising:

a cable designating step of designating one or more cables to be clamped;

a cable area calculating step of calculating a cross-sectional area of each designated cable based on attribute data of each cable, and calculating an area necessary for clamping the cables based on a result of the calculation;

a cable clamp selecting step of selecting one or more cable clamps suitable for the area necessary for clamping the cables;

a cable clamp designating step of designating a cable clamp to be used from among the selected cable clamps;

a cable clamp model data retrieving step of retrieving three-dimensional model data of the designated cable clamp which is stored in advance;

a cable clamp position designating step of designating a desired position of the cable clamp;

a cable clamp position determining step of determining a position of the cable clamp based on the three-dimensional model data and data of the designated desired position of the cable clamp;

a cable routing position for clamping designating step of designating control points assigned to a portion of each cable, which is affected by the cable clamp, wherein each control point indicates a reference position in a cable routing;

a cable routing position data adding step of adding data of the designated control points of each cable to data of control points of each cable which are assigned to each cable in advance; and a cable form generating step of generating a complete cable form based on the data obtained in the cable routing position data adding step.

According to this method, (i) the model of the cable clamp is selected based on the area necessary for clamping the cables; (ii) the control points related to the cable clamp are designated; and (iii) the data of the designated control points are added to the data of control points assigned to each cable in advance. Therefore, the form of the clamped portion of each cable can be simultaneously determined together with the forms of the other portions of the cable, so that the designer can design the cable forms in a short time. Therefore, the man-hour necessary for the design can be reduced, and the selection of the cable clamp and testing of the cable routing can be easily performed, thereby improving the design quality.

In the above methods, the control points designated in the cable routing position for clamping designating step may include points determined so that the cables pass perpendicularly through end faces of the cable clamp.

Also in the above methods, the control points designated in the cable routing position for clamping designating step may include points determined at positions away from each end face of the cable clamp by a minimum bend radius of each cable along the direction perpendicular to each end face.

The present invention also provides a computer readable storage medium storing a program for making a three-dimensional CAD system execute an operation of designing forms of a cable clamp and cables, the operation comprising:

a cable area calculating process of calculating a cross-sectional area of each of one or more designated cables to be clamped, based on attribute data of each cable, and calculating an area necessary for clamping the cables based on a result of the calculation;

a cable clamp checking process of comparing an inner-diameter area corresponding to an inner diameter of a designated cable clamp with the area necessary for clamping the cables;

a cable routing position data adding process of adding data of designated control points assigned to a portion of each cable, which is affected by the cable clamp, to data of control points of each cable which are assigned to each cable, in advance, wherein each control point indicates a reference position in a cable routing; and a cable form generating process of generating a complete cable form based on the data obtained in the cable routing position data adding process.

The present invention also provides a computer readable storage medium storing a program for making a three-dimensional CAD system execute an operation of designing forms of a cable clamp and cables, the operation comprising:

a cable area calculating process of calculating a cross-sectional area of each of one or more designated cables to be clamped, based on attribute data of each cable, and calculating an area necessary for clamping the cables based on a result of the calculation;

a cable clamp selecting process of selecting one or more cable clamps suitable for the area necessary for clamping the cables;

a cable clamp designating process of designating a cable clamp to be used from among the selected cable clamps;

a cable routing position data adding process of adding data of designated control points assigned to a portion of each cable, which is affected by the cable clamp, to data of control points of each cable which are assigned to each cable, in advance, wherein each control point indicates a reference position in a cable routing; and a cable form generating process of generating a complete cable form based on the data obtained in the cable routing position data adding process.

The present invention also provides a computer readable storage medium storing a program for making a three-dimensional CAD system execute an operation of designing forms of a cable clamp and cables, the operation comprising:

a cable area calculating process of calculating a cross-sectional area of each of one or more designated cables to be clamped, based on attribute data of each cable, and calculating an area necessary for clamping the cables based on a result of the calculation;

a cable clamp selecting process of selecting one or more cable clamps suitable for the area necessary for clamping the cables;

a cable clamp designating process of designating a cable clamp to be used from among the selected cable clamps;

a cable clamp model data retrieving process of retrieving three-dimensional model data of the designated cable clamp which is stored in advance;

a cable clamp position determining process of determining a position of the cable clamp based on the three-dimensional model data and data of a designated desired position of the cable clamp;

a cable routing position data adding process of adding data of designated control points assigned to a portion of each cable, which is affected by the cable clamp, to data of control points of each cable which are assigned to each cable, in advance, wherein each control point indicates a reference position in a cable routing; and a cable form generating process of generating a complete cable form based on the data obtained in the cable routing position data adding process.

In the above programs, the designated control points may include points determined so that the cables pass perpendicularly through end faces of the cable clamp.

Also in the above programs, the designated control points include points determined at positions away from each end face of the cable clamp by a minimum bend radius of each cable along the direction perpendicular to each end face.

BRIEF DESCRIPTION OF THE DRAWINGS

FIG. 2 is a diagram showing an example of the cable data of each designated cable.

FIG. 3 is a diagram showing an example of the calculation of the cross-sectional area of each cable.

FIG. 4 is a diagram showing an example of the data of the cable clamp.

FIG. 5 is a diagram showing an example of the arrangement of the cables which pass through the cable clamp.

DESCRIPTION OF THE PREFERRED EMBODIMENTS

Figure 1:
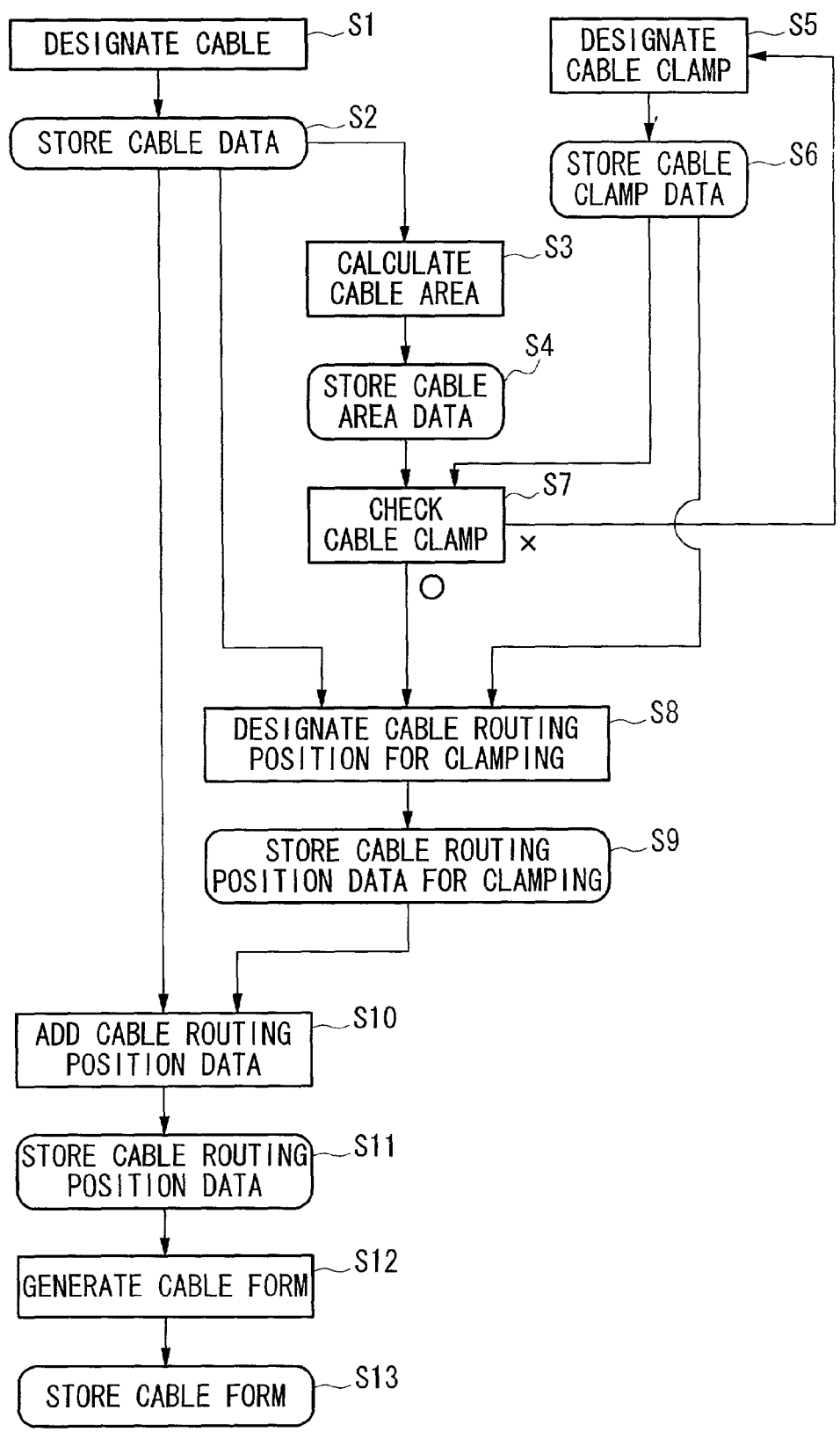
FIG. 1 is a flowchart of the processes performed in the first embodiment according to the present invention.

Hereinafter, embodiments according to the present invention will be explained in detail with reference to the drawings.

The method of designing the form of the cable clamp and cables according to the present invention is applied to a three-dimensional CAD system using a data processing apparatus such as a general purpose computer, work station, personal computer, or the like. The method is executed by making the software (in effect, the hardware) execute a series of specific processes. Typically, the program including these processes is stored in a computer readable storage medium such as a flexible disk or a CD-ROM. Therefore, the kind of hardware constituting the three-dimensional CAD system is not limited, and the structure of the hardware for executing the method of the present invention is not shown in the drawings.

First Embodiment

The first embodiment of the present invention will be explained below.

In the first embodiment, the cable clamp used and the cables which pass through the cable clamp are designated. As shown in FIG. 5, three cables 1, 2, and 3 are passed through a cable clamp 10. Each of the cables 1, 2, and 3 has specific attribute data such as the (cable) diameter and the minimum bend radius. In addition, control points in the cable routing are assigned to each cable, in advance. Each control point indicates a reference position in the design of the cable routing. However, the portion to be clamped in the cable does not have any control points determined in advance. In addition, the minimum bend radius is abbreviated to the "bend radius" in the following explanation.

The verification of the cable clamp is performed as follows. The cross section of each cable passing through the cable clamp is first calculated, and based on the calculated result, the area necessary for clamping the three cables is calculated in consideration of a predetermined margin (i.e., design allowance). The calculated area necessary for the clamping is then compared with the actual area corresponding to the inner-diameter of the cable clamp, thereby verifying whether the designated cable clamp can be used.

The form of each cable which passes through the cable clamp is determined as follows. As shown in FIG. 5, the position of each cable passing through the pipe-shaped cable clamp 10 is first determined. In the example shown, the three cables 1, 2, and 3 passing through the cable clamp 10 are positioned from the upper left side towards the lower right side.

Figures 6, 7:
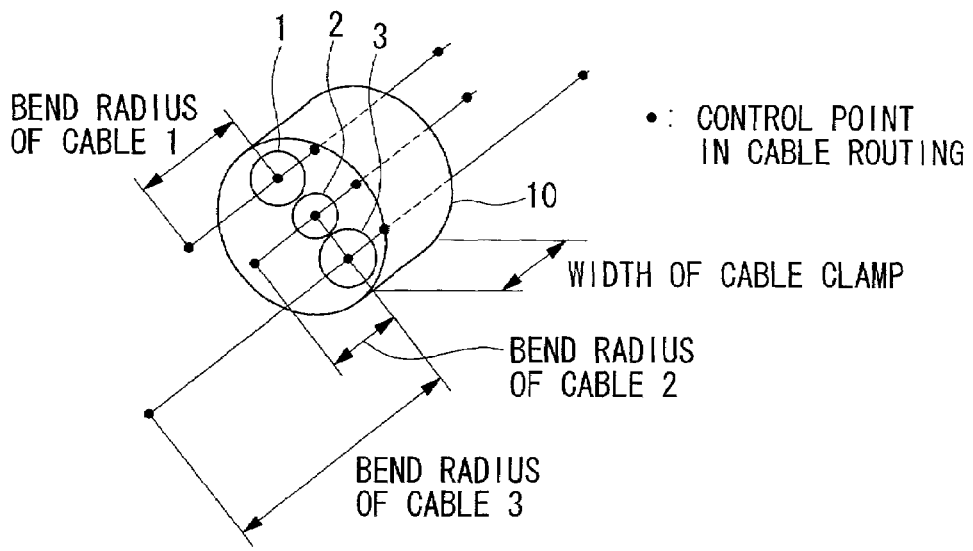
FIG. 6 is a diagram showing an example of the designated control points related to the cable clamp.
FIG. 7 is a diagram showing an example of the data of the cable routing determined by synthesizing the control points.

Next, as shown in FIG. 6, additional control points in the cable routing are determined so that the cables 1, 2, and 3 pass perpendicularly through the end faces of the cable clamp 10 (that is, each cable passes through each end face along the direction perpendicular to each end face). Here, the end faces are not actually present in the pipe-shaped cable clamp, but the positions of such assumed faces are obvious. In addition, other control points are further determined at positions away from each end face of the cable clamp by the bend radius of each cable along the direction perpendicular to each end face. The (black) dots in FIG. 6 indicate the determined control points. These control points are added to the existing control points of each cable so that the form of the portion (of each cable) clamped by the cable clamp can be simultaneously determined with the form of the remaining portions of the cable.

Here, data of the additional control points in the cable routing are added to the data of the cable clamp. Accordingly, if the position of the cable clamp is slightly shifted in the design, the cable routing can be easily modified by only modifying the added control points with respect to the cable clamp.

FIG. 1 is a flowchart of the processes performed in the first embodiment. The operation of the first embodiment will be explained below in detail with reference to this flowchart. In the flowchart, in each process indicated by a normal rectangle, an actual operation or data processing is performed, while in each process indicated by a rectangle with rounded corners, data storage in memory or the like is performed.

In the cable designating process of step S1, the cables to be clamped are designated. In the present embodiment, as shown in FIG. 5, the three cables 1, 2, and 3 are put through the cable clamp 10. Each of the cables 1, 2, and 3 has attribute data such as the cable diameter and minimum bend radius, and data of the control points in the cable routing, wherein no control point has been assigned to the portion to be clamped by a cable clamp.

In the cable data storing process of step S2, attributes such as the cable diameter and minimum bend radius, and data of the control points of each cable designated in the above step S1 are stored. For example, data as shown in FIG. 2 is stored.

In the cable area calculating process of step S3, the diameter of each cable stored in the cable data storing process (step S2) is retrieved, and the cross-sectional area of the cable is calculated. FIG. 3 shows an example of the calculated areas obtained by squaring each cable diameter, that is, the area necessary for clamping the cable is calculated based on the squared cable diameter.

In the cable area data storing process of step S4, the area necessary for clamping each cable, calculated in the above cable area calculating process (step S3), is stored.

In the cable clamp designating process of step S5, the cable clamp to be used is designated.

In the cable clamp data storing process of step S6, the attribute data of the cable clamp 10 designated in the cable clamp designating process of step S5 is stored. The attribute data includes the inner diameter, the (circular) form at the inner diameter (i.e., inner-diameter form), the area corresponding to the inner diameter (i.e., inner-diameter area), the clamping width, and the like. FIG. 4 shows an example of the stored data (here, data of cable clamp A).

In the cable clamp checking process of step S7, the area necessary for clamping the cables is compared with the inner-diameter area of the cable clamp. If the inner-diameter area of the cable clamp is equal to or larger than the area necessary for clamping the cables, then the cable routing position designating process for clamping of step S8 is executed, while if the inner-diameter area of the cable clamp is smaller than the area necessary for clamping the cable, then the cable clamp designating process of step S5 is executed again so as to re-designate a cable clamp because the cables cannot be clamped in the latter case.

In the cable routing position designating process for clamping of step S8, the attribute data (cable diameter and bend radius) of the cables 1, 2, and 3 and the attribute data (inner-diameter form and clamping width) of the cable clamp 10 are retrieved, and the arrangement of the cables in the cable clamp 10 is designated. In the present embodiment, the cables are arranged as shown in FIG. 5. In addition, a control point away from each end face of the cable clamp is determined by the bend radius of each cable along the direction perpendicular to each end face. The (black) dots in FIG. 6 indicate the determined control points (i.e., related to the cable clamp), that is, four dots are determined for each of the cables 1, 2, and 3.

In the cable routing position data storing process for clamping of step S9, the position data of the control points with respect to the cable clamp is stored.

In the cable routing position data adding process of step S10, (i) the cable diameter, bend radius, and data of the control points of each cable stored in the cable data storing process of step S2, and (ii) the position data of the control points with respect to the cable clamp stored in the cable routing position data storing process for clamping of step S9 are retrieved, and the cable routing is determined by synthesizing the retrieved data. Accordingly, for example, the data shown in FIG. 7 is obtained. As shown in FIG. 7, four control points are newly added to the data of each cable shown in FIG. 2.

In the cable routing position data storing process of step S11, the position data of the control points in the synthesized cable routing, the data of each cable diameter, and the data of each bend radius are stored.

In the cable form generating process of step S12, the position data of the control points in the synthesized cable routing, the data of each cable diameter, and the data of each bend radius, stored in the cable routing position data storing process of step S11, are retrieved, and each cable form is generated.

In the cable form storing process of step S13, the data of each cable form generated in the cable form generating process of step S12 is stored.

Second Embodiment

The second embodiment of the present invention will be explained below.

In the first embodiment above, the cable clamp to be used is chosen by a designer; however in the second embodiment, a cable clamp suitable for clamping the cables in consideration of the necessary area is automatically selected.

Figure 8:
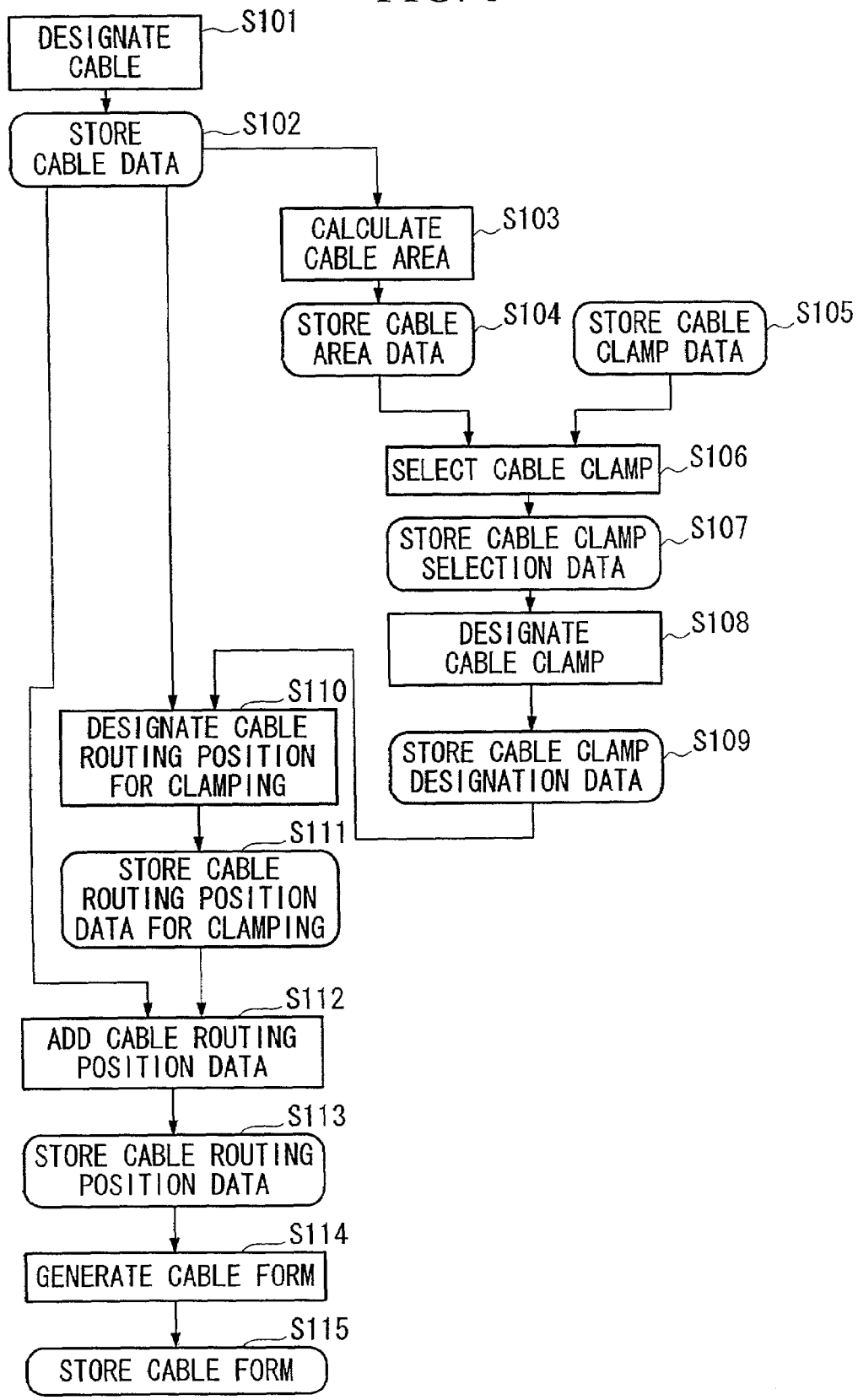
FIG. 8 is a flowchart of the processes performed in the second embodiment according to the present invention.

FIG. 8 is a flowchart of the processes performed in the second embodiment. The operation of the second embodiment will be explained below in detail with reference to this flowchart. In the flowchart, in each process indicated by a normal rectangle, an actual operation or data processing is performed, while in each process indicated by a rectangle with rounded corners, data storage in memory or the like is performed. Here, processes having the same names as those in FIG. 1 are basically the same processes as those of the first embodiment, and thus an explanation thereof is simplified.

In the cable designating process of step S101, the cables to be clamped are designated.

In the cable data storing process of step S102, attributes such as the cable diameter and minimum bend radius, and data of the control points of each cable designated in the above step S101 are stored.

In the cable area calculating process of step S103, the diameter of each cable stored in the cable data storing process (step S102) is retrieved, and the cross-sectional area of the cable is calculated, thereby calculating the area necessary for clamping the cable.

In the cable area data storing process of step S104, the area necessary for clamping each cable, calculated in the above cable area calculating process (step S103), is stored.

In the cable clamp data storing process of step S105, data of cable clamps which can be used are stored.

In the cable clamp selecting process of step S106, cable clamps suitable for the area necessary for clamping each cable, calculated in the above cable area calculating process (step S103), are selected with reference to the data of the cable clamps which can be used, stored in the cable clamp data storing process of step S105.

In the cable clamp selection data storing process of step S107, data of the selected cable clamps is stored.

In the cable clamp designating process of step S108, the cable clamp to be used is designated by the designer from among the cable clamps selected above.

In the cable clamp designation data storing process of step S109, attribute data of the designated cable clamp is stored.

In the cable routing position designating process for clamping of step S110, (i) data of the cable diameter and the bend radius, stored in the cable data storing process (step S102), and (ii) data of the inner-diameter form and the clamping width of the cable clamp stored in the cable clamp designation data storing process of step S109, are retrieved, and the positions of control points corresponding to the cable clamp in the cable routing are designated.

In the cable routing position data storing process (for clamping) of step S111, the position data of control points for clamping, designated in the above step S110, is stored.

In the cable routing position data adding process of step S112, (i) data of the cable diameter, the bend radius, and the control points of each cable stored in the cable data storing process (step S102), and (ii) the position data of control points for clamping stored in the cable routing position data storing process for clamping of step S111, are retrieved, and the cable routing is determined by synthesizing the retrieved data.

In the cable routing position data storing process of step S113, the position data of the control points in the synthesized cable routing, the data of each cable diameter, and the data of each bend radius are stored.

In the cable form generating process of step S114, the position data of the control points in the synthesized cable routing, the data of each cable diameter, and the data of each bend radius, stored in the cable routing position data storing process of step S113, are retrieved, and each cable form is generated.

In the cable form storing process of step S115, the data of each cable form generated in the cable form generating process of step S114 is stored.

Third Embodiment

The third embodiment of the present invention will be explained below.

In the above first embodiment, the cable clamp to be used is chosen by a designer; however in the third embodiment, a cable clamp suitable for clamping the cables in consideration of the necessary area is automatically selected. In addition, the third embodiment has a distinctive feature of using a three-dimensional model of the cable clamp, in comparison with the first and second embodiments.

Figure 9:
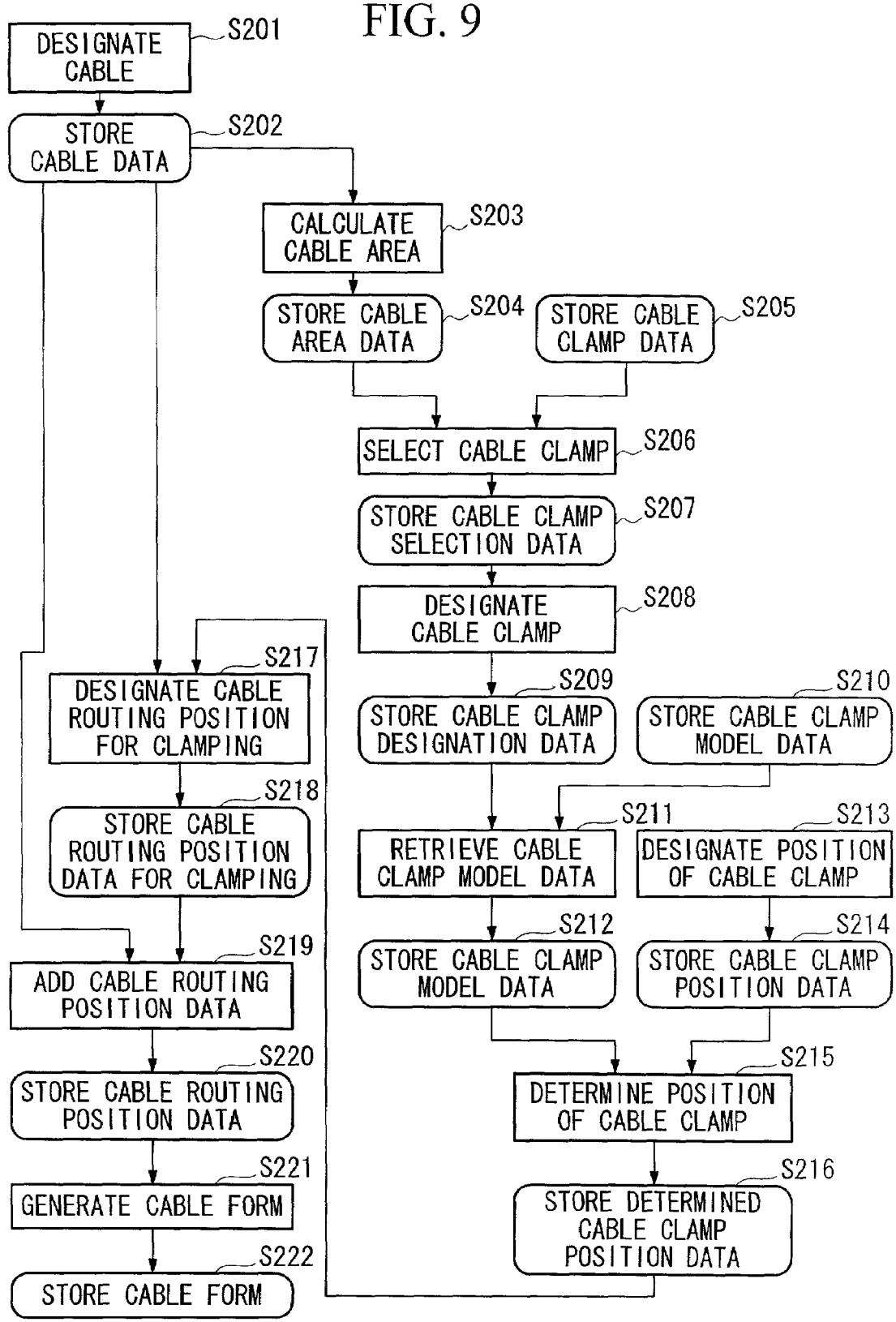
FIG. 9 is a flowchart of the processes performed in the third embodiment according to the present invention.

FIG. 9 is a flowchart of the processes performed in the third embodiment. The operation of the third embodiment will be explained below in detail with reference to this flowchart. In the flowchart, in each process indicated by a normal rectangle, an actual operation or data processing is performed, while in each process indicated by a rectangle with rounded corners, data storage in memory or the like is performed. Here, processes having the same names as those in FIG. 1 or 8 are basically the same processes as those of the first or second embodiment, and thus an explanation thereof is simplified.

In the cable designating process of step S201, the cables to be clamped are designated.

In the cable data storing process of step S202, attributes such as the cable diameter and minimum bend radius, and data of the control points of each cable designated in the above step S201 are stored.

In the cable area calculating process of step S203, the diameter of each cable stored in the cable data storing process (step S202) is retrieved, and the cross-sectional area of the cable is calculated, thereby calculating the area necessary for clamping the cable.

In the cable area data storing process of step S204, the area necessary for clamping each cable, calculated in the above cable area calculating process (step S203), is stored.

In the cable clamp data storing process of step S205, data of the cable clamps which can be used are stored.

In the cable clamp selecting process of step S206, cable clamps suitable for the area necessary for clamping each cable, calculated in the above cable area calculating process (step S203), are selected with reference to the data of the cable clamps which can be used, stored in the cable clamp data storing process of step S205.

In the cable clamp selection data storing process of step S207, data of the selected cable clamps are stored.

In the cable clamp designating process of step S208, the cable clamp to be used is designated by the designer among the cable clamps selected above.

In the cable clamp designation data storing process of step S209, attribute data of the designated cable clamp is stored.

In the cable clamp model data storing process of step S210, data of three-dimensional models of the cable clamps which can be used are stored.

In the cable clamp model data retrieving process of step S211, data of the three-dimensional model of the cable clamp designated in step S208 is retrieved.

In the cable clamp model data storing process of step S212, data of the three-dimensional model of the designated cable clamp is stored.

In the cable clamp position designating process of step S213, the desired position where the cable clamp is to be arranged is designated.

In the cable clamp position data storing process of step S214, data of the designated position of the cable clamp is stored.

In the cable clamp position determining process of step S215, the position of the cable clamp is determined based on the model data and the position data of the designated cable clamp.

In the determined cable clamp position data storing process of step S216, the data of the determined position of the cable clamp is stored.

In the cable routing position designating process for clamping of step S217, (i) data of the cable diameter and the bend radius, stored in the cable data storing process of step S202, (ii) data of the determined position of the cable clamp stored in the determined cable clamp position data storing process of step S216, and (iii) data of the inner-diameter form and the clamping width of the cable clamp stored in the cable clamp designation data storing process of step S209, are retrieved, and the positions of control points corresponding to the cable clamp in the cable routing are designated.

In the cable routing position data storing process (for clamping) of step S218, the position data of control points for clamping, designated in step S217, is stored.

In the cable routing position data adding process of step S219, (i) data of the cable diameter, the bend radius, and the control points of each cable stored in the cable data storing process (step S202), and (ii) the position data of control points for clamping stored in the cable routing position data storing process for clamping of step S218, are retrieved, and the cable routing is determined by synthesizing the retrieved data.

In the cable routing position data storing process of step S220, the position data of the control points in the synthesized cable routing, the data of each cable diameter, and the data of each bend radius are stored.

In the cable form generating process of step S221, the position data of the control points in the synthesized cable routing, the data of each cable diameter, and the data of each bend radius, stored in the cable routing position data storing process of step S220, are retrieved, and each cable form is generated.

In the cable form storing process of step S222, data of each cable form generated in the cable form generating process of step S221 is stored.

In the above embodiments, three cables are clamped. However, the number of cables to be clamped is not limited, that is, one or more cables can be clamped in the present invention.

What is claimed is:

1. A method of designing forms of a cable clamp and cables using a three-dimensional CAD system, comprising:
   designating one or more cables to be clamped;
   calculating a cross-sectional area of each designated cable based on attribute data of each cable;

calculating an area necessary for clamping the designated cables based on a result of the cross-sectional area calculation;

designating a cable clamp to be used;

comparing an inner-diameter area corresponding to an inner diameter of the cable clamp with the area necessary for clamping the cables;

designating control points assigned to a portion of each cable affected by the cable clamp, wherein each control point indicates a reference position in a cable routing;

adding data of the designated control points of each cable to data of control points of each cable which are assigned to each cable in advance to provide cable routing position data; and generating a complete cable form based on the cable routing position data.

2. A method of designing forms of a cable clamp and cables using a three-dimensional CAD system, comprising:

designating one or more cables to be clamped;

calculating a cross-sectional area of each designated cable based on attribute data of each cable;

calculating an area necessary for clamping the designated cables based on a result of the cross-sectional area calculation;

selecting one or more cable clamps suitable for the area necessary for clamping the cables;

designating a cable clamp to be used from among the selected cable clamps;

designating control points assigned to a portion of each cable affected by the cable clamp, where each control point indicates a reference position in a cable routing;

adding data of the designated control points of each cable to data of control points of each cable which are assigned to each cable in advance to provide cable routing position data; and generating a complete cable form based on the cable routing position data.

3. A method of designing forms of a cable clamp and cables using a three-dimensional CAD system, comprising:

designating one or more cables to be clamped;

calculating a cross-sectional area of each designated cable based on attribute data of each cable;

calculating an area necessary for clamping the designated cables based on a result of the cross-sectional area calculation;

selecting one or more cable clamps suitable for the area necessary for clamping the cables;

designating a cable clamp to be used from among the selected cable clamps;

retrieving three-dimensional model data of the designated cable clamp which is stored in advance;

designating a desired position of the cable clamp;

determining a position of the cable clamp based on the three-dimensional model data and data of the designated desired position of the cable clamp;

designating control points assigned to a portion of each cable, affected by the cable clamp, wherein each control point indicates a reference position in a cable routing;

adding data of the designated control points of each cable to data of control points of each cable which are assigned to each cable in advance to provide cable routing position data; and generating a complete cable form based on the cable routing position data.

4. A method of designing forms of a cable clamp and cables, as claimed in any one of claims 1 to 3, wherein the designated control points include points determined so that the cables pass perpendicularly through end faces of the cable clamp.

5. A method of designing forms of a cable clamp and cables, as claimed in any one of claims 1 to 3, wherein the designated control points include points determined at positions away from each end face of the cable clamp by a minimum bend radius of each cable along the direction perpendicular to each end face.

6. A method of designing forms of a cable clamp and cables, as claimed in any one of claim 2 or 3, wherein each of the one or more cable clamps suitable for the area necessary for clamping the cables is of a different cross-sectional area.

7. A computer readable storage medium storing a program for making a three-dimensional CAD system execute an operation of designing forms of a cable clamp and cables, the operation comprising:

calculating a cross-sectional area of each of one or more designated cables to be clamped, based on attribute data of each cable;

calculating an area necessary for clamping the designated cables based on a result of the cross-sectional area calculation;

comparing an inner-diameter area corresponding to an inner diameter of a designated cable clamp with the area necessary for clamping the designated cables;

adding data of designated control points of each cable affected by the cable clamp, to data of control points of each cable which are assigned to each cable, in advance, to provide cable routing position data, wherein each control point indicates a reference position in a cable routing; and generating a complete cable form based on the cable routing position data.

8. A computer readable storage medium storing a program for making a three-dimensional CAD system execute an operation of designing forms of a cable clamp and cables, the operation comprising:

calculating a cross-sectional area of each of one or more designated cables to be clamped, based on attribute data of each cable;

calculating an area necessary for clamping the designated cables based on a result of the cross-sectional area calculation;

selecting one or more cable clamps suitable for the area necessary for clamping the cables;

designating a cable clamp to be used from among the selected cable clamps;

adding data of designated control points of each cable affected by the cable clamp, to data of control points of each cable which are assigned to each cable, in advance, to provide cable routing position data, wherein each control point indicates a reference position in a cable routing; and generating a complete cable form based on the cable routing position data.

9. A computer readable storage medium storing a program for making a three-dimensional CAD system execute an operation of designing forms of a cable clamp and cables, the operation comprising:

calculating a cross-sectional area of each of one or more designated cables to be clamped, based on attribute data of each cable;

calculating an area necessary for clamping the designated cables based on a result of the cross-sectional area calculation;

selecting one or more cable clamps suitable for the area necessary for clamping the cables;

designating a cable clamp to be used from among the selected cable clamps;

retrieving three-dimensional model data of the designated cable clamp which is stored in advance;

determining a position of the cable clamp based on the three-dimensional model data and data of a designated desired position of the cable clamp;

adding data of designated control points of each cable affected by the cable clamp, to data of control points of each cable which are assigned to each cable, in advance, to provide cable routing position data, wherein each control point indicates a reference position in a cable routing; and generating a complete cable form based on the cable routing position data.

10. A computer readable storage medium as claimed in any one of claims 7 to 9, wherein the designated control points include points determined so that the cables pass perpendicularly through end faces of the cable clamp.

11. A computer readable storage medium as claimed in any one of claims 7 to 9, wherein the designated control points include points determined at positions away from each end face of the cable clamp by a minimum bend radius of each cable along the direction perpendicular to each end face.

12. A computer readable storing medium as claimed in any one of claim 8 or 9, wherein each of the one or more cable clamps suitable for the area necessary for clamping the cables is of a different cross sectional area.

* * * * *